United States Patent
Youel, II et al.

(10) Patent No.: US 10,397,415 B1
(45) Date of Patent: Aug. 27, 2019

(54) SYSTEMS AND METHODS FOR AUTOMATICALLY TRANSFERRING AUDIOVISUAL CONTENT

(71) Applicant: GOPRO, INC., San Mateo, CA (US)

(72) Inventors: Jeffrey Youel, II, San Mateo, CA (US); Otto Sievert, Oceanside, CA (US); Vijay Suryavanshi, San Mateo, CA (US); Gurprit Cheema, Carlsbad, CA (US); Mark Petersen, San Mateo, CA (US); Leland Treebs, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 144 days.

(21) Appl. No.: 15/282,429

(22) Filed: Sep. 30, 2016

(51) Int. Cl.
*H04N 1/00* (2006.01)
*H04N 1/327* (2006.01)
*H04N 5/232* (2006.01)

(52) U.S. Cl.
CPC ..... *H04N 1/00244* (2013.01); *H04N 1/00214* (2013.01); *H04N 1/32765* (2013.01); *H04N 5/23241* (2013.01); *H04N 2201/0084* (2013.01)

(58) Field of Classification Search
CPC .......... H04N 1/00244; H04N 1/32765; H04N 1/00214; H04N 5/23241; H04N 2201/0084
See application file for complete search history.

(56) References Cited

U.S. PATENT DOCUMENTS

| | | | |
|---|---|---|---|
| 5,649,240 A | 7/1997 | Saegusa | |
| 5,721,989 A | 2/1998 | Kitazawa | |
| 5,914,941 A | 6/1999 | Janky | |
| 6,341,201 B1 | 1/2002 | Ishiguro | |
| 6,415,107 B1 | 7/2002 | Ogawa | |
| 6,633,685 B1 | 10/2003 | Kusama | |
| 7,196,805 B1 * | 3/2007 | Toebes | G06Q 50/10 348/211.1 |

(Continued)

FOREIGN PATENT DOCUMENTS

| | | |
|---|---|---|
| CN | 102571743 A | 7/2012 |
| EP | 0583908 | 11/2000 |

(Continued)

OTHER PUBLICATIONS

PCT International Search Report and Written Opinion for PCT/US2013/051548, dated Feb. 7, 2014, 14 Pages.

(Continued)

*Primary Examiner* — Timothy J Henn

(74) *Attorney, Agent, or Firm* — Esplin & Associates, PC

(57) ABSTRACT

Systems and methods to automatically transfer audiovisual content include camera devices, client computing devices, and centralized servers. A camera device captures audiovisual content and notifies an external entity, e.g., a (client) computing device or a centralized server. The external entity may effectuate transfer of the content to other computing devices and/or destinations. Operations on the audiovisual content, including but not limited to tagging, transcoding, clipping, speed changes, and/or image cropping, are synchronized and propagated across different computing devices and the centralized server such that any user from any computing device can be presented with the latest version of any particular audiovisual content.

20 Claims, 6 Drawing Sheets

(56) References Cited

U.S. PATENT DOCUMENTS

| | | | |
|---|---|---|---|
| 7,289,141 B2* | 10/2007 | Yamada | H04N 1/00278 348/207.2 |
| 7,512,886 B1 | 3/2009 | Herberger | |
| 7,599,608 B2 | 10/2009 | Takemoto | |
| 7,885,426 B2 | 2/2011 | Golovchinsky | |
| 7,970,240 B1 | 6/2011 | Chao | |
| 8,180,161 B2 | 5/2012 | Haseyama | |
| 8,606,073 B2 | 12/2013 | Woodman | |
| 8,750,157 B1 | 6/2014 | Jagannath | |
| 8,774,560 B2 | 7/2014 | Sugaya | |
| 8,811,206 B2 | 8/2014 | Shukla | |
| 8,971,623 B2 | 3/2015 | Gatt | |
| 8,984,143 B2 | 3/2015 | Serra | |
| 8,990,328 B1 | 3/2015 | Grigsby | |
| 8,994,800 B2 | 3/2015 | Brockway | |
| 8,995,903 B2 | 3/2015 | Brockway | |
| 9,025,014 B2 | 5/2015 | Brockway | |
| 9,036,016 B2 | 5/2015 | Brockway | |
| 9,041,727 B2 | 5/2015 | Ubillos | |
| 9,142,257 B2 | 9/2015 | Woodman | |
| 9,342,376 B2 | 5/2016 | Jain | |
| 9,418,283 B1 | 8/2016 | Natarajan | |
| 9,781,293 B2* | 10/2017 | Jeong | G06F 16/00 |
| 2002/0067412 A1 | 6/2002 | Kawai | |
| 2002/0133515 A1* | 9/2002 | Kagle | G06F 17/24 715/256 |
| 2002/0165721 A1 | 11/2002 | Chang | |
| 2003/0100297 A1 | 5/2003 | Riordan | |
| 2004/0001706 A1 | 1/2004 | Jung | |
| 2004/0003151 A1* | 1/2004 | Bateman | G06F 13/385 710/72 |
| 2004/0107366 A1 | 6/2004 | Balfanz | |
| 2005/0025454 A1 | 2/2005 | Nakamura | |
| 2005/0036766 A1 | 2/2005 | Takemoto | |
| 2005/0108031 A1 | 5/2005 | Grosvenor | |
| 2005/0198018 A1 | 9/2005 | Shibata | |
| 2006/0080286 A1 | 4/2006 | Svendsen | |
| 2006/0115108 A1 | 6/2006 | Rodriguez | |
| 2006/0208088 A1 | 9/2006 | Sekiguchi | |
| 2007/0049201 A1 | 3/2007 | Nagano | |
| 2007/0073937 A1* | 3/2007 | Feinberg | G06F 9/445 710/62 |
| 2007/0288331 A1 | 12/2007 | Ebrom | |
| 2008/0046545 A1 | 2/2008 | Koren | |
| 2008/0123976 A1 | 5/2008 | Coombs | |
| 2008/0183843 A1 | 7/2008 | Gavin | |
| 2008/0232780 A1 | 9/2008 | Yamada | |
| 2008/0247377 A1 | 10/2008 | Van Horn | |
| 2008/0298305 A1 | 12/2008 | Nakamura | |
| 2008/0310405 A1 | 12/2008 | Cox | |
| 2009/0019995 A1 | 1/2009 | Miyajima | |
| 2009/0027499 A1 | 1/2009 | Nicholl | |
| 2009/0125559 A1 | 5/2009 | Yoshino | |
| 2009/0128634 A1* | 5/2009 | Miura | H04N 5/765 348/207.1 |
| 2009/0252474 A1 | 10/2009 | Nashida | |
| 2010/0002098 A1* | 1/2010 | Hagiwara | G11B 27/034 348/231.99 |
| 2010/0046842 A1 | 2/2010 | Conwell | |
| 2010/0086216 A1 | 4/2010 | Lee | |
| 2010/0161720 A1 | 6/2010 | Colligan | |
| 2010/0199182 A1 | 8/2010 | Lanza | |
| 2010/0274714 A1 | 10/2010 | Sims | |
| 2010/0311441 A1 | 12/2010 | Hazlett | |
| 2010/0318660 A1 | 12/2010 | Balsubramanian | |
| 2011/0001910 A1 | 1/2011 | Fujiyoshi | |
| 2011/0019104 A1 | 1/2011 | Kwak | |
| 2011/0044303 A1 | 2/2011 | Ji | |
| 2011/0050926 A1 | 3/2011 | Asano | |
| 2011/0063457 A1 | 3/2011 | Tokumitsu | |
| 2011/0103700 A1 | 5/2011 | Haseyama | |
| 2011/0137156 A1 | 6/2011 | Razzaque | |
| 2011/0170086 A1 | 7/2011 | Oouchida | |
| 2011/0206351 A1 | 8/2011 | Givoly | |
| 2011/0242098 A1 | 10/2011 | Tamaru | |
| 2011/0307610 A1 | 12/2011 | Hayashi | |
| 2012/0014673 A1 | 1/2012 | O'Dwyer | |
| 2012/0027381 A1 | 2/2012 | Kataoka | |
| 2012/0030263 A1 | 2/2012 | John | |
| 2012/0044354 A1 | 2/2012 | Cheng | |
| 2012/0063337 A1 | 3/2012 | Shukla | |
| 2012/0099572 A1 | 4/2012 | Kato | |
| 2012/0106449 A1 | 5/2012 | Shibuya | |
| 2012/0110031 A1 | 5/2012 | Lahcanski | |
| 2012/0141019 A1 | 6/2012 | Zhang | |
| 2012/0210205 A1 | 8/2012 | Sherwood | |
| 2012/0210228 A1 | 8/2012 | Wang | |
| 2012/0246114 A1 | 9/2012 | Edmiston | |
| 2012/0249802 A1 | 10/2012 | Taylor | |
| 2012/0283574 A1 | 11/2012 | Park | |
| 2012/0322413 A1 | 12/2012 | Haddad | |
| 2012/0327225 A1 | 12/2012 | Barley | |
| 2013/0076908 A1 | 3/2013 | Bratton | |
| 2013/0081113 A1 | 3/2013 | Cherian | |
| 2013/0120592 A1 | 5/2013 | Bednarczyk | |
| 2013/0182166 A1 | 7/2013 | Shimokawa | |
| 2013/0189925 A1 | 7/2013 | Staskawicz | |
| 2013/0204865 A1* | 8/2013 | DeLuca | G06Q 30/02 707/722 |
| 2013/0222583 A1 | 8/2013 | Earnshaw | |
| 2013/0222627 A1 | 8/2013 | Earnshaw | |
| 2013/0223279 A1 | 8/2013 | Tinnakornsrisuphap | |
| 2013/0235071 A1 | 9/2013 | Ubillos | |
| 2013/0239051 A1 | 9/2013 | Albouze | |
| 2013/0327225 A1 | 12/2013 | Chappell | |
| 2013/0330019 A1 | 12/2013 | Kim | |
| 2013/0337857 A1 | 12/2013 | Hassan | |
| 2014/0028435 A1 | 1/2014 | Brockway | |
| 2014/0028816 A1 | 1/2014 | Brockway | |
| 2014/0028817 A1 | 1/2014 | Brockway | |
| 2014/0028818 A1 | 1/2014 | Brockway | |
| 2014/0109184 A1 | 4/2014 | Parker, II | |
| 2014/0149865 A1 | 5/2014 | Tanaka | |
| 2014/0152762 A1 | 6/2014 | Ukil | |
| 2014/0282661 A1 | 9/2014 | Martin | |
| 2015/0039646 A1 | 2/2015 | Sharifi | |
| 2015/0071547 A1 | 3/2015 | Keating | |
| 2015/0113009 A1 | 4/2015 | Zhou | |
| 2015/0156247 A1 | 6/2015 | Hensel | |
| 2015/0222817 A1 | 8/2015 | Brockway | |
| 2015/0287435 A1 | 10/2015 | Land | |
| 2016/0029105 A1 | 1/2016 | Newman | |
| 2016/0094601 A1 | 3/2016 | Besehanic | |
| 2016/0103830 A1 | 4/2016 | Cheong | |
| 2016/0189752 A1 | 6/2016 | Galant | |
| 2016/0260000 A1 | 9/2016 | Yamakawa | |
| 2016/0286235 A1 | 9/2016 | Yamamoto | |
| 2017/0263288 A1* | 9/2017 | Sievert | G11B 27/102 |
| 2017/0351922 A1* | 12/2017 | Campbell | G06K 9/00765 |
| 2018/0004773 A1* | 1/2018 | Kojima | G06F 17/30017 |

FOREIGN PATENT DOCUMENTS

| | | |
|---|---|---|
| EP | 1286529 | 11/2006 |
| EP | 1742410 | 1/2007 |
| EP | 1742410 A1 | 1/2007 |
| EP | 2190175 A1 | 5/2010 |
| JP | H09181966 A | 7/1997 |
| JP | 2005252459 A | 9/2005 |
| JP | 2006053694 A | 2/2006 |
| JP | 2008059121 A | 3/2008 |
| JP | 2009053748 A | 3/2009 |
| JP | 2011188004 A | 9/2011 |
| WO | 2006001361 A1 | 1/2006 |
| WO | 2009040538 A1 | 4/2009 |
| WO | 2012057623 A1 | 5/2012 |
| WO | 2012086120 A1 | 6/2012 |

OTHER PUBLICATIONS

Office Action for U.S. Appl. No. 13/558,273, dated Oct. 15, 2014, 19 Pages.

(56) References Cited

OTHER PUBLICATIONS

Supplementary European Search Report for European Patent Application No. EP 13823575, dated Jul. 22, 2015, 8 Pages.
Extended European Search Report for European Patent Application No. EP 15193305, dated Mar. 24, 2016, 9 Pages.
Extended European Search Report for European Patent Application No. EP 15193308, dated Mar. 24, 2016, 12 Pages.
Extended European Search Report for European Patent Application No. EP 15193309, dated Mar. 24, 2016, 10 Pages.
Communication pursuant to Article 94(3) EPC for European Patent Application No. EP 13823575.9, dated Apr. 5, 2016, 4 Pages.
PCT International Written Opinion for PCT/US2015/041624, dated Dec. 17, 2015, 7 Pages.
PCT International Search Report and Written Opinion for PCT/US15/12086 dated Mar. 17, 2016, 20 pages.
Schroff et al., 'FaceNet: A Unified Embedding for Face Recognition and Clustering,' IEEE Conference on Computer Vision and Pattern Recognition (CVPR), 2016, 10 pgs.
Parkhi et al., 'Deep Face Recognition,' Proceedings of the British Machine Vision, 2015,12 pgs.
Iandola et al., 'SqueezeNet: AlexNet-level accuracy with 50x fewer parameters and <0.5MB model size', arXiv:1602.07360v3 [cs.CV] Apr. 6, 2016 (9 pgs.).
Ioffe et al., 'Batch Normalization: Accelerating Deep Network Training by Reducing Internal Covariate Shift,' arXiv:1502.03167, 2015, 11 pgs.
He et al., 'Deep Residual Learning for Image Recognition,' arXiv:1512.03385, 2015,12 pgs.

Han et al., Deep Compression: Compressing Deep Neural Networks with Pruning, Trained Quantization and Huffman Coding, International Conference on Learning Representations 2016, 14 pgs.
PCT International Search Report and Written Opinion for PCT/US16/31076, dated Aug. 8, 2016, 19 Pages.
Yang et al., 'Unsupervised Extraction of Video Highlights Via Robust Recurrent Auto-encoders' arXiv:1510.01442v1 [cs.CV] Oct. 6, 2015 (9 pgs).
Tran et al., 'Learning Spatiotemporal Features with 3D Convolutional Networks', arXiv:1412.0767 [cs.CV] Dec. 2, 2014 (9 pgs).
PCT International Search Report for PCT/US15/41624 dated Nov. 4, 2015, 5 pages.
PCT International Search Report for PCT/US15/23680 dated Aug. 3, 2015, 4 pages.
PSonar URL: http://www.psonar.com/about retrieved on Aug. 24, 2016, 3 pages.
PCT International Preliminary Report on Patentability for PCT/US2015/023680, dated Oct. 4, 2016, 10 pages.
Nicole Lee, Twitter's Periscope is the best livestreaming video app yet; Mar. 26, 2015 URL:http://www.engadget.com/2015/03/26/periscope/ [Retrieved Aug. 25, 2015] 11 pages.
FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf encoding.html>.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structAVP a ck et. html>.
Japanese Office Action for JP Application No. 2013-140131, dated Aug. 5, 2014, 6 pages.
Office Action for U.S. Appl. No. 13/831,124, dated Mar. 19, 2015, 14 pages.

* cited by examiner

SYSTEMS AND METHODS FOR AUTOMATICALLY TRANSFERRING AUDIOVISUAL CONTENT

FIELD OF THE DISCLOSURE

This disclosure relates to transferring automatically audiovisual content represented as electronic files, from camera devices to either client computing devices or a centralized server, or both.

BACKGROUND

Digital cameras are increasingly used to capture images of their surroundings. The images may be still images or video clips, including a series of single image frames that can be manipulated further to provide effects such as slow motion type effects. The video files also can include audio.

Captured video clips may be manually transferred to other computing devices, e.g., through a wired connection such as a Universal Serial Bus (USB) cable. However, some video clips may be large electronic files that take more than a minute to be transferred.

SUMMARY

One aspect of the disclosure relates to a system configured for automatically transferring and managing audiovisual content. The system may include one or more camera devices configured to capture audiovisual content, including but not limited to photographs, videos or video information, visual information, audio information, depth information, and/or combinations and/or derivatives thereof, which may be jointly referred to as audiovisual content. The audiovisual content may be represented as electronic files. The system may further include client computing devices, centralized servers, networks, communication channels, electronic storage, physical processors, and/or other components. In some implementations, the system may be configured to transfer automatically audiovisual content from a camera device to one or more computing devices, e.g., a client computing device—such as a smartphone—associated with a particular user. In some implementations, the system may be configured to transfer automatically audiovisual content from a camera device to a centralized server that is configured to communicate with multiple camera devices and/or multiple client computing devices and/or multiple users.

In some implementations, a particular user may be associated with more than one client computing device in addition to a particular camera device. The system may be configured to facilitate transferring audiovisual content among different client computing devices, in addition to a centralized server. For example, a particular user may be associated with a first or primary client computing device (e.g., a smartphone) and a second or secondary client computing device (e.g., a laptop computer). The system may be configured to transfer audiovisual content from the particular camera device to both the first client computing device and the second client computing device. The user may use the different client computing devices to perform different operations and/or use different features. For example, the first client computing device may be used to add tags, highlights, and/or other metadata to a particular item of audiovisual content. In some implementations, operations performed by the first client computing device may be available and/or supported when less than a full and/or complete item of audiovisual content is locally available at the first client computing device. A partial, incomplete, and/or otherwise "low-resolution" version of a particular item of audiovisual content may be referred to as a representation or thumbnail of the particular item. For example, the second client computing device may be used to edit, crop, and/or otherwise modify a particular item of audiovisual content. In some implementations, operations performed by the second client computing device may be available and/or supported only when a full and/or complete item of audiovisual content is locally available at the second client computing device, in addition to sufficient processing power and/or storage capacity. For example, certain operations may not be supported by the first client computing device, e.g. due to insufficient processing power and/or storage capacity. In some implementations, the audiovisual content may furthermore be transferred to the centralized server.

The camera devices may be physically separate and distinct from the client computing devices and/or the centralized server(s). In some implementations, the components of the system may be physically separate and/or remote from one another. Captured audiovisual content may be transferred from a camera device that is associated with a particular user to a client computing device that is associated with the same user. In some implementations, captured audiovisual content may be transferred from the camera device that is associated with a particular user to a centralized server that is configured to facilitate online access to the audiovisual content, e.g. to the same user. For example, the user may, after a transfer of audiovisual content from a camera device to a centralized server, access the audiovisual content through different client computing devices that are configured to communicate with the centralized server, e.g., upon authentication.

Users may, after a transfer of audiovisual content from a camera device to a centralized server, use a mobile application (e.g. on a smart phone) and/or other software application to engage with the audiovisual content. For example, users may add tags, highlights, and/or other metadata, edit the content, crop the content, combine the content with other content, and/or otherwise augment or modify the content. As used herein, the term "crop" may refer to reducing the duration of an item of audiovisual content, reducing the resolution of an item of audiovisual content, reducing the frame-rate of an item of audiovisual content, reducing the pixel-density of an item of audiovisual content (e.g. width and height in pixels), reducing the number of colors in an item of audiovisual content, and/or other reductions of audiovisual content. Any such operations on the audiovisual content may be synchronized and propagated across different computing devices and the centralized server such that any user from any computing device may be presented with the latest version of any particular audiovisual content.

The one or more physical processors may be configured by machine-readable instructions, e.g. to provide information-processing capabilities and/or execute computer program components. Executing the machine-readable instructions may cause the one or more physical processors to facilitate automatically transferring and managing audiovisual content, e.g. post-capture. The machine-readable instructions may include one or more of a capture component, a camera notification component, a thumbnail component, a camera transfer component, a device notification component, a device transfer component, a presentation component, an access component, a user input component, an identifier component, a file management component, a registration component, a synchronization component, a configuration component, an order component, and/or other components. Some of the computer program components may be physically located within a camera device. Some of the computer program components may be physically located within a client computing device. Some of the computer program components may be part of a centralized server. Some of the computer program components may be part of one or more of a camera device, a client computing device, a centralized server, and/or an external resource. In some implementations, one or more computer program components may be part of multiple other components.

In some implementations, the system may include one or more client computing devices, which may be referred to as client computing platforms. Client computing devices may include one or more processors configured to execute computer program components. The computer program components may be configured to enable a user associated with a client computing device to interact with the system, any component thereof, other client computing devices, and/or provide other functionality attributed herein to client computing devices. By way of non-limiting example, client computing devices may include one or more of a desktop computer, a laptop computer, a handheld computer, a Net-Book, a mobile telephone, a smartphone, a tablet, a (smart) watch, a mobile computing platform, a gaming console, a television, an electronic device, a personal medical device, and/or other computing devices. Users may communicate using any of the computing platforms described in this disclosure, and/or any combination of computing platforms described in this disclosure.

Camera devices may include, by way of non-limiting example, one or more of an image sensor, a camera, an infrared sensor, a light sensor, a motion sensor, a depth sensor, a microphone, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. In some implementations, a camera device may include more than one image sensor.

As used herein, the term "motion sensor" may include one or more sensors configured to generate output conveying information related to position, location, motion, movement, acceleration, and/or other motion-based parameters. Individual sensors may be configured to capture audiovisual information, geolocation information, orientation and/or motion information, and/or other information. Captured information may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. Output signals (and/or information based thereon) may be stored and/or transferred in electronic files. For example, output signals generated by an image sensor may be stored on electronic storage media in an electronic file. As used herein, the term "file" may refer to information organized and/or grouped in electronic format for any period of time.

In some implementations, an image sensor of a camera device may be integrated with electronic storage such that captured information may be stored in the integrated embedded storage. In some implementations, the system may include one or more camera devices. For example, a camera may include one or more image sensors and electronic storage media. In some implementations, an image sensor may be configured to transfer captured information to remote electronic storage media, e.g. through "the cloud."

The capture component may be configured to capture, store, analyze, and/or process audiovisual content and/or other information. By way of non-limiting example, camera devices may include computer processors configured by machine-readable instructions to capture audiovisual content, as well as perform other tasks attributed to the capture component. For example, the capture component may be configured to store audiovisual content electronically, convert the content to one or more different electronic file formats, extract information from the content, generate identifiers based on the content, perform operations on the content, including but not limited to editing or cropping the content, and/or perform other operations on the content. By way of non-limiting example, camera devices may include computer processors configured by machine-readable instructions to capture audiovisual content, as well as perform other tasks attributed to the capture component. As used herein, the term "audiovisual content" may be interpreted as video information. Information captured by camera devices may be represented by video information and/or other information. Video information may define one or more of visual information, audio information, and/or other information that may define the video information.

The camera notification component may be configured to generate and communicate notifications. For example, the camera notification component may be configured to generate notifications indicating that one or more items of audiovisual content have been captured by the camera device. In some implementations, notifications may include information extracted from the audiovisual content, and/or otherwise based on the audiovisual content. For example, a notification may include one or more identifiers of an item of audiovisual content. In some implementations, the camera notification component may be configured to communicate notifications to other components in the system, including but not limited to client computing devices, centralized servers, and/or other computing devices. By way of non-limiting example, camera devices may include computer processors configured by machine-readable instructions to generate notifications, as well as perform other tasks attributed to the camera notification component.

The thumbnail component may be configured to generate representations of audiovisual content. For example, a representation of a particular item of audiovisual content may be a still image selected from, derived from, and/or otherwise based on captured video information. In some implementations, a representation may be referred to as a thumbnail. In some implementations, a representation that is smaller than the audiovisual content represented may be referred to as a low-resolution representation. The audiovisual content that is represented by the representation may be referred to as the original content. For example, a 30-second video message with stereo sound may be associated with a 2-second representation that has no sound, such as a Graphics Interchange Format (GIF) image, or a still image. The term "low-resolution" may refer to the lower frame-rate of a video representation (compared to the original content), a lower the pixel-density of an image in the representation (e.g. width and height of an representative image in pixels), a lower number of different colors supported in the particular electronic file format of the representation, a compressed version of the original content, a shorter duration of the representation compared to the original content, and/or any other representation stored in less (bits of) storage compared to the original message. As used herein, such representations may be referred to as thumbnails. By way of non-limiting example, camera devices and/or client computing devices may include computer processors configured by machine-readable instructions to generate representations of audiovisual content, as well as perform other tasks attributed to the thumbnail component.

The camera transfer component may be configured to communicate and/or transfer information from a camera device to another component in the system. For example, the camera transfer component may be configured to transfer notifications, identifiers, low-resolution representations, and/or other information from a camera device to one or more client computing devices. In some implementations, the camera transfer component may be configured to transfer notifications, identifiers, low-resolution representations, and/or other information from a camera device to a centralized server. As used herein, the term "transfer" merely indicates the direction of certain information from a first device or origin to a second device or destination. Even if the second device requests or "pulls" the information from the first device, that information is considered to be transferred from the first device to the second device. By way of non-limiting example, camera devices may include computer processors configured by machine-readable instructions to transfer notifications, as well as perform other tasks attributed to the camera transfer component.

The device notification component may be configured to obtain and/or receive information from camera devices and/or other components of the system. For example, the device notification component may be configured to receive notifications from camera devices. In some implementations, the device notification component may be configured to analyze and/or process received information. By way of non-limiting example, client computing devices and/or centralized servers may include computer processors configured by machine-readable instructions to receive notifications, as well as perform other tasks attributed to the device notification component.

The device transfer component may be configured to effectuate transfer of information to one or more of a client computing device and a centralized server. In some implementations, the transferred information may include one or more of audiovisual content, representations of audiovisual content, identifiers of audiovisual content, notifications pertaining audiovisual content, and/or other information. In some implementations, transfer of information may occur responsive to receipt of particular information, including but not limited to receipt of a notification. For example, in response to receipt of a particular notification, the device transfer component may be configured to effectuate transfer of a low-resolution representation of a particular item of audiovisual content and an identifier of the particular item of audiovisual content. For example, the particular notification may indicate that the particular item of audiovisual content has been captured. By way of non-limiting example, client computing devices and/or centralized servers may include computer processors configured by machine-readable instructions to effectuate transfer of information, as well as perform other tasks attributed to the device transfer component.

The presentation component may be configured to present information to users. For example, information may be presented via user interfaces. In some implementations, the presented information may include audiovisual content. For example, the presented information may include low-resolution representations of captured audiovisual content. In some implementations, the presentation component may be configured to facilitate user interaction with users. For example, the presentation component may be configured to control a user interface. In some implementations, the presentation component may be configured to facilitate sharing of information with users, for example through social media. By way of non-limiting example, client computing devices may include computer processors configured by machine-readable instructions to present information to users, as well as perform other tasks attributed to the presentation component.

The access component may be configured to manage electronic access to information, including but not limited to audiovisual content, representations of audiovisual content, identifiers of audiovisual content, notifications pertaining audiovisual content, and/or other information. In some implementations, the access component may be configured to store information. For example, the access component may be configured to facilitate access to representations of audiovisual content that have been stored in a central location. By way of non-limiting example, centralized servers may include computer processors configured by machine-readable instructions to manage electronic access to information, as well as perform other tasks attributed to the access component.

The user input component may be configured to facilitate user input from users. For example, the user input component may be configured to receive user input from users. In some implementations, user input may be received through a user interface. For example, user interfaces may be presented at client computing devices. User input may indicate whether particular information shall be transferred from a particular first device to one or more other devices. For example, in some implementations, received user input may indicate whether a particular item of audiovisual content shall be transferred from a camera device to a client computing device and/or to a centralized server. In some implementations, user input may indicate whether particular information shall be removed from one or more particular devices. For example, received user input may indicate whether a particular item of audiovisual content shall be removed from a camera device, a centralized server, and/or other computing devices. In some implementations, one or more features attributed to the presentation component and one or more features attributed to the user input component may be performed by the same component such as, by way of non-limiting example, a touchscreen. By way of non-limiting example, any computing device may include computer processors configured by machine-readable instructions to receive user input from users, as well as perform other tasks attributed to the user input component.

The identifier component may be configured to generate identifiers of information, in particular audiovisual content. In some implementations, generated identifiers may be based on the content of the identified information. Alternatively, and/or simultaneously, in some implementations, generated identifiers may be based on information that is extracted from the identified information. In some implementations, generation of identifiers may be based on an identification scheme that allows any device to determine the same unique identifier of a particular item of information, such as a particular item of audiovisual content. By way of non-limiting example, any computing device may include computer processors configured by machine-readable instructions to generate identifiers, as well as perform other tasks attributed to the identifier component.

The file management component may be configured to facilitate management of electronic files, e.g., in a computing device. For example, the file management component may be configured to facilitate management of electronic files for a centralized server. Management of electronic files may include transferring files, moving files within a directory structure, renaming files, copying files, deleting or removing files, and/or performing other operations of file management on electronic files. For example, the electronic files managed by the file management component may include one or more of audiovisual content, representations of audiovisual content, identifiers of audiovisual content, notifications pertaining audiovisual content, and/or other information. By way of non-limiting example, any computing device may include computer processors configured by machine-readable instructions to facilitate management of electronic files, as well as perform other tasks attributed to the file management component.

The registration component may be configured to effectuate registration of information with one or more computing devices. For example, the registration component may be configured to effectuate registration of a particular item of audiovisual content with a client computing device and/or a centralized server. In some implementations, registration may include associating a first item of information with a second item of information. For example, in some implementations, the registration component may be configured to register a particular item of audiovisual content by establishing an association between the particular item of audiovisual content and a particular identifier that identifies the same item of audiovisual content. In some implementations, registration may be used to determine and/or verify whether a particular item of information has been stored in a particular manner. For example, a registration status of a particular item of audiovisual content may be used to determine that that particular item of audiovisual content has not yet been transferred to a centralized server. By way of non-limiting example, any computing device may include computer processors configured by machine-readable instructions to register information, as well as perform other tasks attributed to the registration component.

The synchronization component may be configured to synchronize information and/or operations between different computing devices. In some implementations, the operations may include operations of file management pertaining to electronic files. Alternatively, and/or simultaneously, in some implementations, the operations may include operations performed on the content of particular information such as audiovisual content. For example, the operations may include adding tags or highlights, editing the content, modifying playback speed and/or frame rate, cropping the content, combining the content with other content, and/or otherwise augmenting and/or modifying the content. Upon such synchronization, any operations on an item of content or other type of information may be propagated to other computing devices such that any user from any computing device may be presented with the latest version of any particular information. By way of non-limiting example, any computing device may include computer processors configured by machine-readable instructions to synchronize information and/or operations, as well as perform other tasks attributed to the synchronization component.

The configuration component may be configured to obtain configuration information. The configuration information may be used to establish one or more communication channels, e.g., between different components of the system. In some implementations, the configuration component may be configured to obtain configuration information that may be used to establish a communication channel between a camera device and a centralized server. In some implementations, a communication channel may include and/or be based on known wireless networks and/or trusted wireless networks. For example, a communication channel may be based on a WiFi network that is associated with the same user as the camera device. In some implementations, the configuration component may be configured to establish communication channels, e.g., based on obtained configuration information. In some implementations, the configuration component may be configured to detect whether one or more communication channels are available. For example, availability may be related to a particular device being in range of a particular wireless network. Alternatively, and/or simultaneously, availability may be conditional upon authentication. By way of non-limiting example, any computing device may include computer processors configured by machine-readable instructions to obtain and/or use configuration information, as well as perform other tasks attributed to the configuration component.

The order component may be configured to determine in which order a set of files should be transferred. In some implementations, the files may include items of audiovisual content. For example, a camera device may have captured two or more items of audiovisual content that need to be transferred to a centralized server. The order component may be configured to determine in which order these two items should be transferred. In some implementations, the order of different files may be based on file size. Alternatively, and/or simultaneously, in some implementations, the order of different files may be based on the content type of the different files. For example, still images may be ordered to be transferred before video messages. By way of non-limiting example, any computing device may include computer processors configured by machine-readable instructions to determine orders for transferring files, as well as perform other tasks attributed to the order component.

One aspect of the disclosure relates to methods for automatically transferring and managing audiovisual content.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
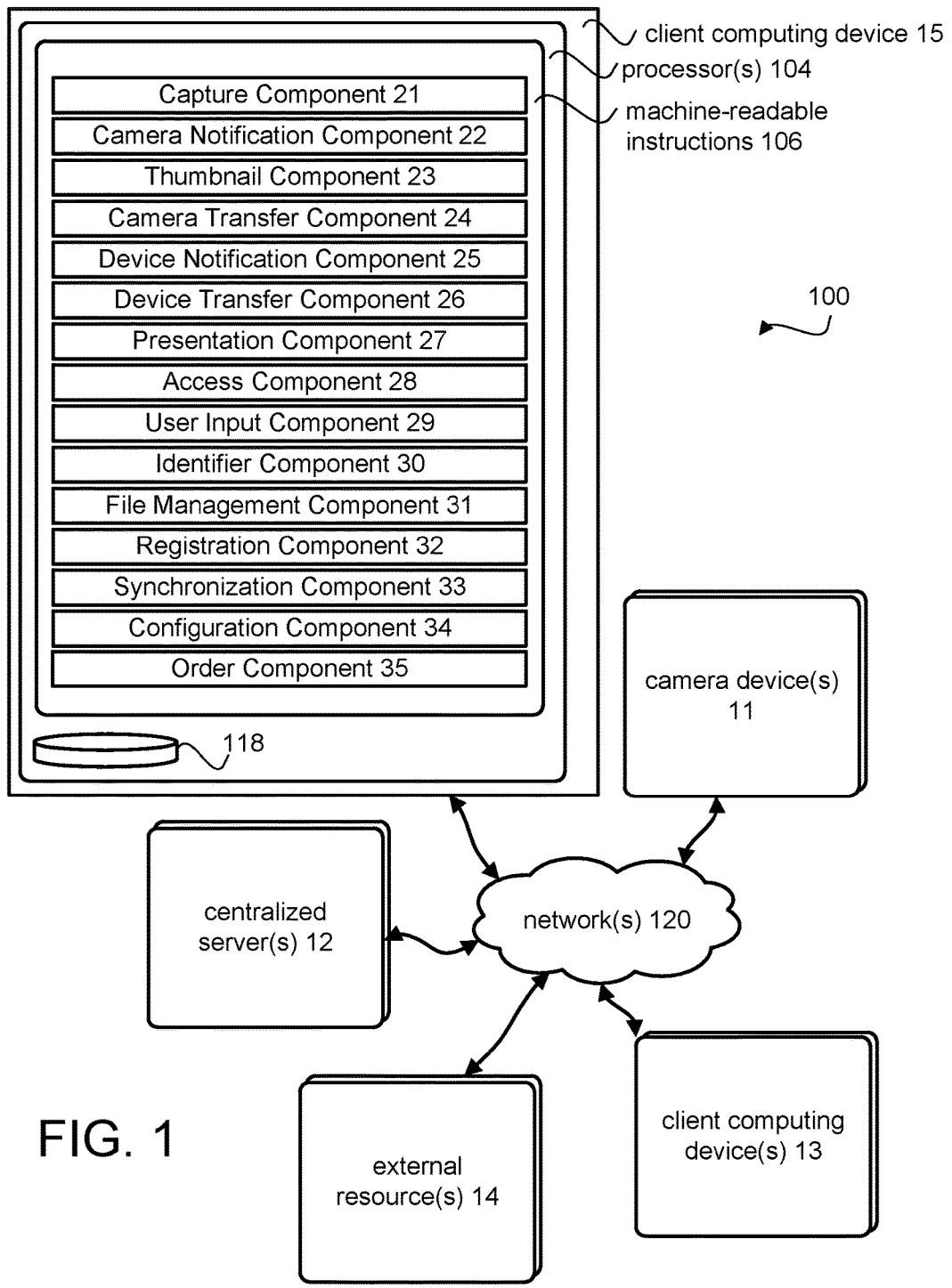
FIG. 1 illustrates a system configured for automatically transferring audiovisual content, in accordance with one or more implementations.

FIG. 1 illustrates a system 100 configured for automatically transferring information including but not limited to audiovisual content, in accordance with one or more implementations. In some implementations, system 100 may facilitate user selection of audiovisual content for transferring from camera devices to other computing devices, including but not limited to client computing devices and centralized servers.

The system 100 may include one or more camera devices 11, client computing devices 15, centralized servers 12, networks 120, communication channels, electronic storage 118, physical processors 104, and/or other components. In some implementations, a particular user may be associated with more than one client computing device in addition to a particular camera device 11. System 100 may be configured to facilitate transferring information among different client computing devices, in addition to centralized server 12. For example, a particular user may be associated with a first or primary client computing device 15 (e.g., a smartphone) and a second or secondary client computing device 13 (e.g., a laptop computer). System 100 may be configured to transfer audiovisual content from camera device 11 to both a primary client computing device 15 and a secondary client computing device 13.

Camera device 11, primary client computing device 15, secondary client computing device 13 and/or centralized server 12 may include one or more physical processors 104 configured by machine-readable instructions 106 and/or other components. Executing the machine-readable instructions 106 may cause the one or more physical processors 104 to facilitate automatic transfer of information. The machine-readable instructions 106 may include one or more of a capture component 21, a camera notification component 22, a thumbnail component 23, a camera transfer component 24, a device notification component 25, a device transfer component 26, a presentation component 27, an access component 28, a user input component 29, an identifier component 30, a file management component 31, a registration component 32, a synchronization component 33, a configuration component 34, an order component 35, and/or other components.

Camera device 11 may be configured to capture audiovisual content, including but not limited to photographs, videos or video information, visual information, audio information, depth information, and/or combinations and/or derivatives thereof, which may be jointly referred to as audiovisual content. The audiovisual content may be represented as electronic files. Camera device 11 may be physically separate and distinct from primary client computing device 15, secondary client computing device 13, and/or the centralized server 12.

In some implementations, camera device 11 may be configured to determine whether camera device 11 is electrically coupled to a power source and/or plugged in. In some implementations, camera device 11 include a rechargeable battery. Camera device 11 may be configured to determine how much of a charge the rechargeable battery is currently holding. In some implementations, camera device 11 may be configured to determine whether the rechargeable battery is holding more or less than a predetermined charge threshold. For example, a charge threshold may be 50%, 60%, 70%, 80%, 90%, and/or another suitable percentage. In some implementations, a charge threshold may be in absolute units rather than in percentages. In some implementations, camera device 11 may be configured to perform operations and/or tasks based on whether the rechargeable battery meets a charge threshold. For example, camera device 11 may be configured to transfer notifications and/or other information subsequent to a determination that the rechargeable battery is currently holding a sufficiently large charge.

Centralized server 12 may be configured to facilitate online access to information, including but not limited to audiovisual content. In some implementations, centralized server 12 may be configured to facilitate management of electronic files. In some implementations, facilitating online access to information may include managing user accounts (e.g. add new accounts for new users), facilitating authentication for access to user accounts (e.g., through passwords and/or other types of identification), and/or perform other tasks related to the use of online user accounts.

One or more physical processors 104 (also referred to as computer processors 104) may be configured by machine-readable instructions 106, e.g. to provide information-processing capabilities and/or execute computer program components. Executing the machine-readable instructions may cause one or more physical processors 104 to facilitate automatically transferring and managing audiovisual content, e.g. post-capture. Electronic storage 118 may be configured to store information electronically.

Capture component 21 may be configured to capture, store, analyze, and/or process audiovisual content and/or other information. By way of non-limiting example, camera devices 11 may include physical processors 104 configured by machine-readable instructions 106 to capture audiovisual content, as well as perform other tasks attributed to capture component 21. For example, capture component 21 may be configured to store audiovisual content electronically, convert the content to one or more different electronic file formats, extract information from the content, generate identifiers based on the content, perform operations on the content, including but not limited to editing or cropping the content, and/or perform other operations on the content.

Figure 2:
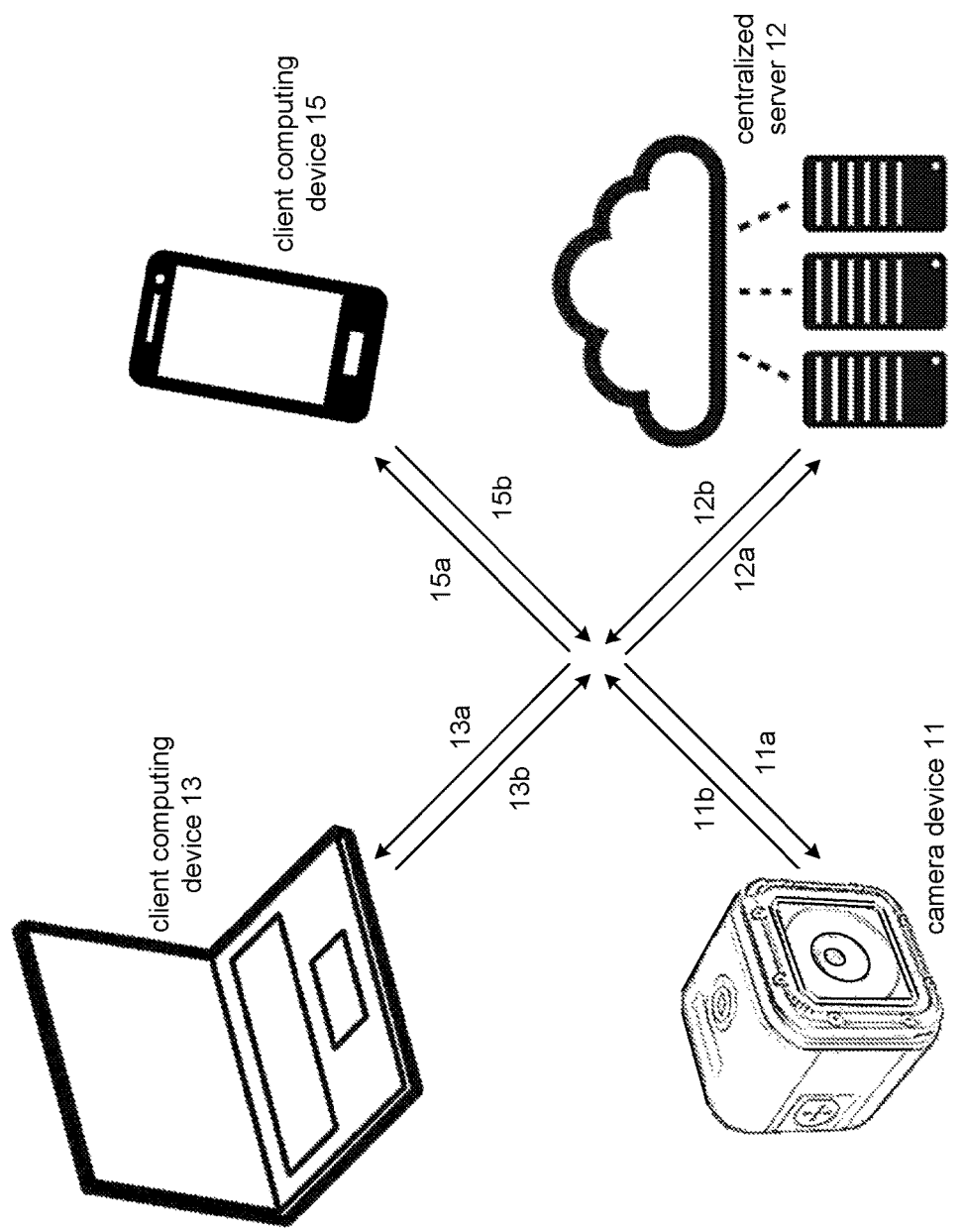
FIG. 2 illustrates an exemplary scenario for the use of a system for automatically transferring audiovisual content.

Camera notification component 22 may be configured to generate and communicate notifications. For example, camera notification component 22 may be configured to generate notifications indicating that one or more items of audiovisual content have been captured by camera device 11. In some implementations, notifications may include information extracted from the audiovisual content, and/or otherwise based on the audiovisual content. For example, a notification may include one or more identifiers of an item of audiovisual content. In some implementations, camera notification component 22 may be configured to communicate notifications to other components in system 100, including but not limited to client computing devices 13/15, centralized servers 12, and/or other computing devices. By way of non-limiting example, FIG. 2 illustrates an exemplary scenario for the use of system 100. In particular, FIG. 2 illustrates a communication channel 11a that may be used to transfer information to camera device 11, and a communication channel 11b that may be used by camera device 11 to transfer information to other components of system 100. In some implementations, transfer of certain information to or from camera device 11 may include the use of both communication channel 11a and communication channel 11b. In some implementations, camera notification component 22 may be configured to communicate notifications through communication channel 11b. FIG. 2 furthermore illustrates a communication channel 15a that may be used to transfer information to client computing device 15, and a communication channel 15b that may be used by client computing device 15 to transfer information to other components of system 100. In some implementations, camera notification component 22 may be configured to communicate notifications from camera device 11 through communication channel 11b and communication channel 15a to client computing device 15.

In some implementations, notifications may be based on Bluetooth communications. For example, a notification may be implemented as a Bluetooth ping and/or advertisement. In some implementations, notifications may be broadcast in a vicinity of a camera device, e.g. through a Bluetooth broadcast. Other communication schemes are considered within the scope of this disclosure.

Figure 3A:
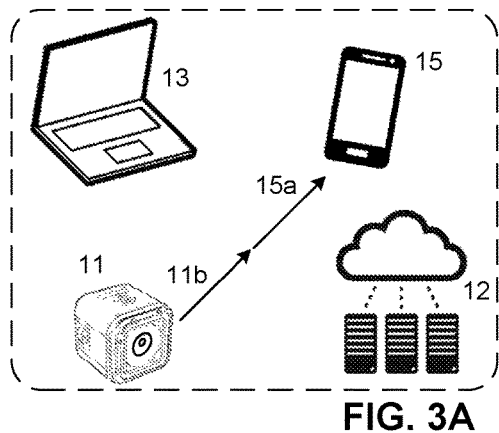
FIGS. 3A-3B-3C-3D-3E-3F-3G-3H-3I-3J-3K-3L illustrate exemplary scenarios for the use of a system for automatically transferring audiovisual content.

By way of non-limiting example, FIG. 3A may illustrate an exemplary scenario for the use of system 100. As depicted in FIG. 3A, camera device 11 may communicate a notification through communication channel 11b and communication channel 15a to client computing device 15. In some implementations, communication channel 11b and communication channel 15a may form a single communication path.

In some implementations, a user may use secondary client computing device 13. Camera notification component 22 may be configured to communicate a notification to secondary client computing device 13. By way of non-limiting example, FIG. 3G may illustrate an exemplary scenario for the use of system 100, in which camera device 11 may communicate a notification through communication channel 11b and communication channel 13a to secondary client computing device 13. In some implementations, communication channel 11b and communication channel 13a may form a single communication path, e.g., a USB cable.

Referring to FIG. 1, thumbnail component 23 may be configured to generate representations of audiovisual content. For example, a representation of a particular item of audiovisual content may be a still image selected from, derived from, and/or otherwise based on captured video information. In some implementations, a representation may be referred to as a thumbnail. In some implementations, a representation that is smaller than the audiovisual content represented may be referred to as a low-resolution representation. The audiovisual content that is represented by the representation may be referred to as the original content. For example, a 30-second video message with stereo sound may be associated with a 2-second representation that has no sound, such as a Graphics Interchange Format (GIF) image, or a still image. In some implementations, one or more representations of audiovisual content may be included in one or more notifications by camera notification component 22. As depicted in FIG. 3A, camera device 11 may communicate a representation through communication channel 11b and communication channel 15a to client computing device 15.

Referring to FIG. 1, camera transfer component 24 may be configured to communicate and/or transfer information from camera device 11 to another component in the system. For example, camera transfer component 24 may be configured to transfer notifications, identifiers, low-resolution representations, and/or other information from camera device 11 to client computing device 15. As depicted in FIG. 3A, camera device 11 may communicate and/or transfer information through communication channel 11b and communication channel 15a to client computing device 15. In some implementations, camera transfer component 24 may be configured to transfer notifications, identifiers, low-resolution representations, and/or other information from camera device 11 to centralized server 12. By way of non-limiting example, FIG. 3B may illustrate an exemplary scenario for the use of system 100, in which camera device 11 may communicate notifications, identifiers, low-resolution representations, and/or other information through communication channel 11b and communication channel 12a to centralized server 12. In some implementations, communication channel 11b and communication channel 12a may form a single communication path.

Figure 3B:
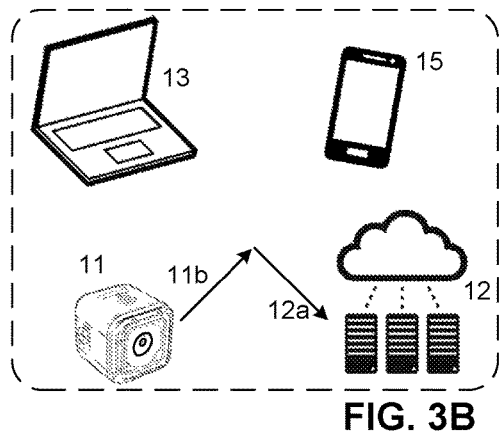

In some implementations, a user may use secondary client computing device 13. Camera transfer component 24 may be configured to transfer information to secondary client computing device 13. By way of non-limiting example, FIG. 3G may illustrate an exemplary scenario for the use of system 100, in which camera device 11 may communicate information through communication channel 11b and communication channel 13a to secondary client computing device 13. In some implementations, communication channel 11b and communication channel 13a may form a single communication path, e.g., a USB cable. Subsequently, secondary client computing device may communicate information through communication channel 13b and communication channel 11a to camera device 11 (as depicted in FIG. 3H), through communication channel 13b and communication channel 15a to client computing device 15 (as depicted in FIG. 3J), and/or through communication channel 13b and communication channel 12a to centralized server 12 (as depicted in FIG. 3L).

Referring to FIG. 1, device notification component 25 may be configured to obtain and/or receive information from camera device 11 and/or other components of system 100. For example, device notification component 25 may be configured to receive notifications from camera device 11. In some implementations, device notification component 25 may be configured to analyze and/or process received information. In some implementations, device notification component 25 of client computing device 15 may be configured to receive a notification from camera device 11. FIG. 3A may depict a transfer to client computing device 15 from camera device 11. In some implementations, device notification component 25 of centralized server 12 may be configured to receive a notification from camera device 11. FIG. 3B may depict a transfer to centralized server 12 from camera device 11.

Referring to FIG. 1, device transfer component 26 may be configured to effectuate transfer of information to client computing device 13, client computing device 15, and/or centralized server 12. In some implementations, the transferred information may include one or more of audiovisual content, representations of audiovisual content, identifiers of audiovisual content, notifications pertaining audiovisual content, and/or other information. In some implementations, transfer of information may occur responsive to receipt of particular information, including but not limited to receipt of a notification. For example, in response to receipt of a particular notification, device transfer component 26 may be configured to effectuate and/or request transfer of a low-resolution representation of a particular item of audiovisual content. Alternatively, and/or simultaneously, in response to receipt of a particular notification, device transfer component 26 may be configured to effectuate and/or request transfer of an identifier of the particular item of audiovisual content. For example, the particular notification may indicate that the particular item of audiovisual content has been captured.

Figure 3C:
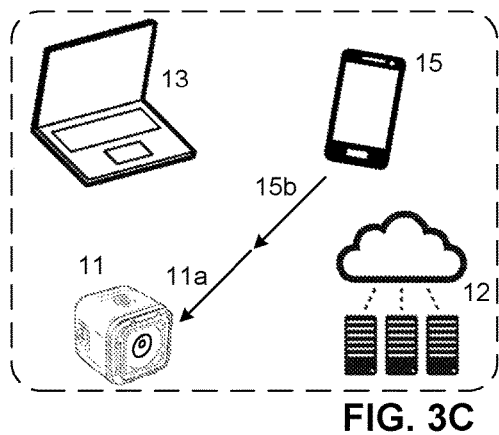

By way of non-limiting example, FIG. 3C may illustrate an exemplary scenario for the use of system 100, in which client computing device 15 requests transfer of a representation of a particular item of audiovisual content through communication channel 15b and communication channel 11a to camera device 11. The corresponding transfer may use different communication paths than the request. For example, the requested information may be transferred via an intermediary computing device. In some implementations, communication channel 15b and communication channel 11a may form a single communication path.

In some implementations, a user may use secondary client computing device 13. For example, in response to receipt of a particular notification, device transfer component 26 may be configured to effectuate and/or request transfer of a low-resolution representation of a particular item of audiovisual content to secondary client computing device 13. By way of non-limiting example, FIG. 3I may illustrate an exemplary scenario for the use of system 100, in which client computing device 15 may communicate information (e.g., a request for transfer) through communication channel 15b and communication channel 13a to secondary client computing device 13. Subsequently, camera device 11 may communicate information (e.g., an item of audiovisual content or its representation) through communication channel 11b and communication channel 13a to secondary client computing device 13 (as depicted in FIG. 3G). Subsequently, secondary client computing device may communicate this information through communication channel 13b and communication channel 15a to client computing device 15 (as depicted in FIG. 3J), and/or through communication channel 13b and communication channel 12a to centralized server 12 (as depicted in FIG. 3L).

Figure 3D:
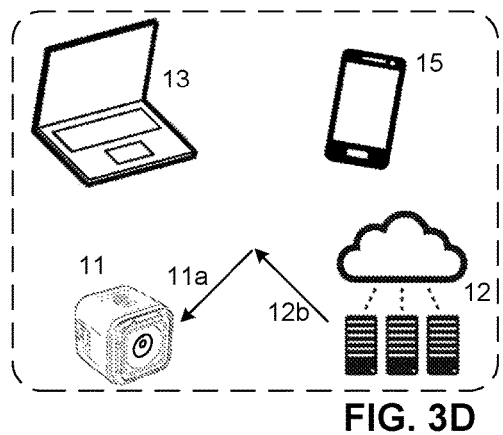

By way of non-limiting example, FIG. 3D may illustrate an exemplary scenario for the use of system 100, in which centralized server 12 requests transfer of a representation of a particular item of audiovisual content through communication channel 12b and communication channel 11a to camera device 11. In some implementations, communication channel 12b and communication channel 11a may form a single communication path.

In some implementations, a user may use secondary client computing device 13. By way of non-limiting example, FIG. 3K may illustrate an exemplary scenario for the use of system 100, in which centralized server 12 requests transfer of a (representation of) a particular item of audiovisual content through communication channel 12b and communication channel 13a to secondary client computing device 13. Subsequently, secondary client computing device 13 may effectuate a transfer as depicted in FIG. 3L, and/or effectuate a transfer as depicted in FIG. 3B and/or FIG. 3E.

Referring to FIG. 1, presentation component 27 may be configured to present information to users. For example, information may be presented via user interfaces. In some implementations, the presented information may include audiovisual content. For example, the presented information may include low-resolution representations of captured audiovisual content. In some implementations, presentation component 27 may be configured to facilitate user interaction with users. For example, the presentation component may be configured to control a user interface. In some implementations, the presentation component may be configured to facilitate sharing of information with users, for example through social media.

Access component 28 may be configured to manage electronic access to information, including but not limited to audiovisual content, representations of audiovisual content, identifiers of audiovisual content, notifications pertaining audiovisual content, and/or other information. In some implementations, access component 28 may be configured to store information. For example, access component 28 may be configured to facilitate access to representations of audiovisual content that have been stored in a central location.

User input component 29 may be configured to facilitate user input from users. For example, user input component 29 may be configured to receive user input from users. In some implementations, user input may be received through a user interface. For example, user interfaces may be presented at client computing device 15. User input may indicate whether particular information shall be transferred from a particular first device to one or more other devices. For example, in some implementations, received user input may indicate whether a particular item of audiovisual content shall be transferred from camera device 11 to client computing device 15 and/or to centralized server 12. In some implementations, user input may indicate whether particular information shall be removed from one or more particular devices. For example, received user input may indicate whether a particular item of audiovisual content shall be removed from camera device 11, centralized server 12, and/or other computing devices.

By way of non-limiting example, FIG. 3C may illustrate an exemplary scenario for the use of system 100, in which client computing device 15 requests transfer of a particular item of audiovisual content through communication channel 15b and communication channel 11a to camera device 11. A similar request for removal may be supported through the same communication channels. FIG. 3A may depict transfer, by camera device 11 through communication channel 11b and communication channel 15a of the particular item of audiovisual content to client computing device 15, in response to the request. In some implementations, client computing device 15 may transfer one or more operations to be performed on a particular item of audiovisual content through communication channel 15b and communication channel 11a to camera device 11. For example, the particular item of audiovisual content may be cropped. Upon receipt of such operations, camera device 11 may perform the operations on the particular item of audiovisual content that is stored on camera device 11. In some implementations, a user may use secondary client computing device 13. For example, one or more operations to be performed on a particular item of audiovisual content may be transferred from secondary client computing device 13 through communication channel 13b and communication channel 11a to camera device 11 (as depicted in FIG. 3H).

Referring to FIG. 1, identifier component 30 may be configured to generate identifiers of information, in particular audiovisual content. In some implementations, generated identifiers may be based on the content of the identified information. Alternatively, and/or simultaneously, in some implementations, generated identifiers may be based on information that is extracted from the identified information. In some implementations, generation of identifiers may be based on an identification scheme that allows any device to determine the same unique identifier of a particular item of information, such as a particular item of audiovisual content. As used herein, the term "unique" is to be interpreted as virtually unique such that the probability of two generated identifiers matching is less than 0.001%. In some implementations, identifiers may be sufficiently unique if more than a trillion items of content can readily and reliably be distinguished from each other. In some implementations, generate identifiers may be unique to one or more camera devices. In some implementations, generate identifiers may be unique to one or more client computing devices. In some implementations, generated identifiers may be unique to one or more users. In some implementations, generate identifiers may be unique to one or more centralized servers.

By way of non-limiting example, any computing device may generate identifiers for items of information, including but not limited to items of audiovisual content.

File management component 31 may be configured to facilitate management of electronic files, e.g., in a computing device. For example, file management component 31 may be configured to facilitate management of electronic files for centralized server 12. Management of electronic files may include transferring files, moving files within a directory structure, renaming files, copying files, deleting or removing files, and/or performing other operations of file management on electronic files. For example, the electronic files managed by file management component 31 may include one or more of audiovisual content, representations of audiovisual content, identifiers of audiovisual content, notifications pertaining audiovisual content, and/or other information.

Registration component 32 may be configured to effectuate and/or verify registration of information with one or more computing devices. For example, registration component 32 may be configured to effectuate registration of a particular item of audiovisual content with client computing device 15 and/or centralized server 12. In some implementations, registration may include associating a first item of information with a second item of information. For example, in some implementations, registration component 32 may be configured to register a particular item of audiovisual content by establishing an association between the particular item of audiovisual content and a particular identifier that identifies the same item of audiovisual content. In some implementations, registration of certain types of audiovisual content may be performed in a centralized location, e.g., by centralized server 12. In some implementations, registration may be used to determine whether a particular item of information has been stored in a particular location and/or manner. For example, a registration status of a particular item of audiovisual content may be used to determine whether the particular item of audiovisual content has been transferred to centralized server 12.

Figure 3E:
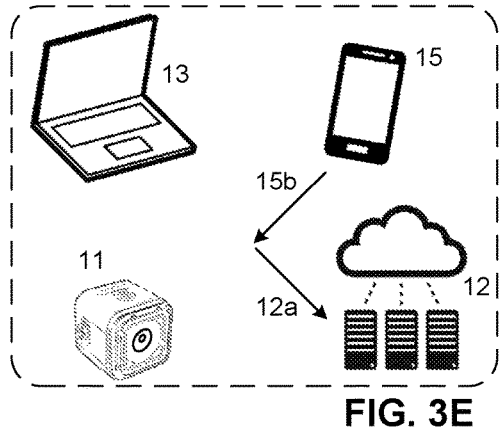
Figure 3F:
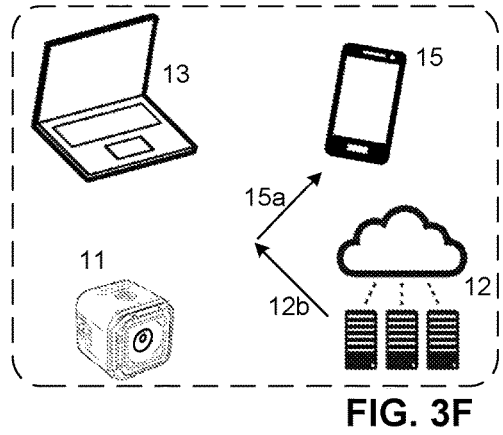
Figure 3G:
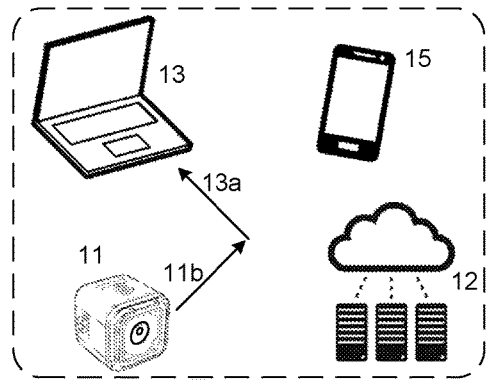
Figure 3H:
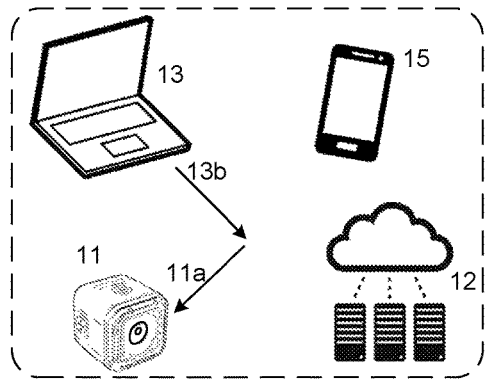
Figure 3I:
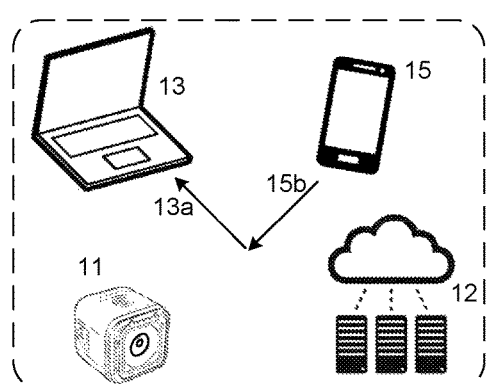
Figure 3J:
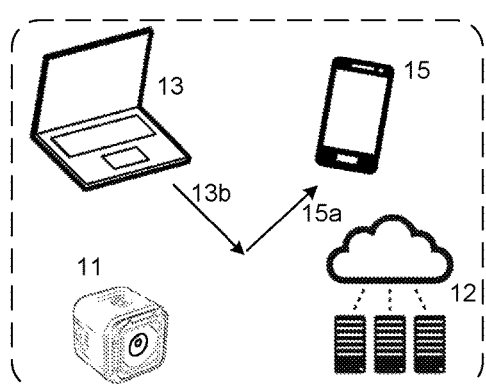
Figure 3K:
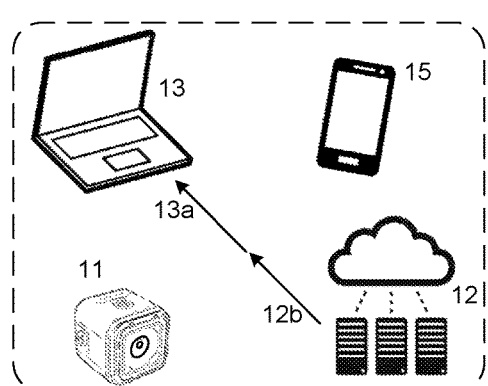
Figure 3L:
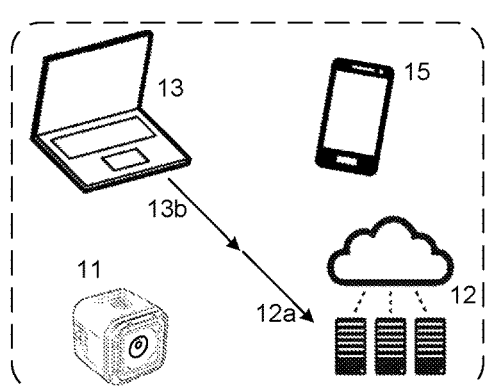

By way of non-limiting example, FIG. 3E may illustrate an exemplary scenario for the use of system 100, in which client computing device 15 may communicate a request for registration for a particular item of audiovisual content through communication channel 15b and communication channel 12a to centralized server 12. In some implementations, communication channel 15b and communication channel 12a may form a single communication path. By way of non-limiting example, FIG. 3B may illustrate an exemplary scenario for the use of system 100, in which camera device 11 may communicate a request for registration of a particular item of audiovisual content through communication channel 11b and communication channel 12a to centralized server 12. In some implementations, centralized server 12 may respond to a request for registration by communicating a reply as depicted in either FIG. 3D or FIG. 3F.

In some implementations, a user may use secondary client computing device 13. Registration component 32 may be configured to effectuate registration of a particular item of audiovisual content through secondary client computing device 13. By way of non-limiting example, FIG. 3L may illustrate an exemplary scenario for the use of system 100, in which secondary client computing device 13 may communicate a request for registration for a particular item of audiovisual content through communication channel 15b and communication channel 12a to centralized server 12.

Referring to FIG. 1, synchronization component 33 may be configured to synchronize information and/or operations between different computing devices. In some implementations, the operations may be selected by users through user interfaces and/or user input component 29. In some implementations, the operations may be provided through users through user interfaces and/or user input component 29. In some implementations, the operations may include operations of file management pertaining to electronic files. In some implementations, the operations may include operations performed on the content of particular information such as audiovisual content. For example, the operations may include adding tags or highlights, editing the content, modifying playback speed and/or frame rate, cropping the content, combining the content with other content, and/or otherwise augmenting and/or modifying the content. Upon such synchronization, any operations on an item of content or other type of information may be propagated to other computing devices such that any user from any computing device may be presented with the latest version of any particular information.

For example, a user may enter a particular operation, through a user interface on client computing device 15 and/or user input component 29, to be performed on a particular item of audiovisual content. In some implementations, the particular item of audiovisual content need not be stored on client computing device 15. For example, a user can crop or tag the particular item even if the particular item of audiovisual content has not been transferred to client computing device 15.

In some implementations, a user can crop or tag the particular item even if the representation of the particular item of audiovisual content has not been transferred to client computing device 15. Subsequently, the particular operation and/or any modifications that correspond to implementing the particular operation on the particular item of audiovisual content (and/or its representation) may be propagated to camera device 11. Alternatively, and/or simultaneously, the particular operation and/or any modifications that correspond to implementing the particular operation on the particular item of audiovisual content (and/or its representation) may be propagated to centralized server 12. Subsequently, the particular operation and/or any modifications that correspond to implementing the particular operation on the particular item of audiovisual content (and/or its representation) may be propagated from centralized server 12 to one or both of camera device 11 and secondary client computing device 13.

In some implementations, the particular operation and/or any modifications that correspond to implementing the particular operation on the particular item of audiovisual content (and/or its representation) may be propagated from client computing device 15 to secondary client computing device 13. Subsequently, the particular operation and/or any modifications that correspond to implementing the particular operation on the particular item of audiovisual content (and/or its representation) may be propagated from secondary client computing device 13 to one or both of camera device 11 and centralized server 12.

In some implementations, whether information and/or operations are propagated to centralized server 12 may be based on whether a particular item of audiovisual content has been transferred to centralized server 12.

In some implementations, a user may decide to which devices information and/or operations will be propagated. For example, a user may control whether a particular type of audiovisual content is transferred and/or propagated to second client computing device 13. In some implementations, a user may decide in which order information and/or operations will be propagated to different devices. For example, propagation to second client computing device 13 may take precedence over propagation to centralized server 12, and/or vice versa.

In some implementations, information and/or operations to be synchronized may originate from secondary client computing device 13. For example, responsive to a particular item of audiovisual content being cropped in half such that the representation of the particular item needs to be updated accordingly, secondary client computing device 13 may communicate with any computing device in system 100 that contains either the particular item or its representation, or both. In some implementations, synchronization component 33 may be configured to synchronize information and/or operations with camera device 11, client computing device 15, and centralized server 12.

In some implementations, a user may enter a particular operation, through a user interface on secondary client computing device 13 and/or user input component 29, to be performed on a particular item of audiovisual content. In some implementations, the particular item of audiovisual content need not be stored on secondary client computing device 13. For example, a user can crop or tag the particular item even if the particular item of audiovisual content has not been transferred to secondary client computing device 13. Subsequently, the particular operation and/or any modifications that correspond to implementing the particular operation on the particular item of audiovisual content (and/or its representation) may be propagated from secondary client computing device 13 to any or all of client computing device 15, camera device 11, and centralized server 12.

In some implementations, particular operations may reduce the resolution and/or the duration of a particular item of audiovisual content. In some implementations, subsequent to certain operations, one or both of the representation of a particular item of audiovisual content and the identifier of a particular item of audiovisual content need to be renewed/regenerated. Synchronization component 33 may be configured to synchronize and/or propagate a new representation of the particular item of audiovisual content and/or the new identifier of the particular item of audiovisual content.

Configuration component 34 may be configured to obtain configuration information. In some implementations, configuration information may be obtained from users, e.g. through user interfaces. In some implementations, configuration information may be based on received user input. The configuration information may be used to establish one or more communication channels, e.g., between different components of system 100. In some implementations, configuration component 34 may be configured to obtain configuration information that may be used to establish one or more communication channels between camera device 11 and centralized server 12. In some implementations, a communication channel may include and/or be based on known wireless networks and/or trusted wireless networks. For example, a communication channel may be based on a WiFi network that is associated with the same user as camera device 11. In some implementations, configuration component 34 may be configured to establish one or more communication channels, e.g., based on obtained configuration information. In some implementations, configuration component 34 may be configured to detect whether one or more communication channels are available. For example, availability may be related to a particular device being in range of a particular wireless network. Alternatively, and/or simultaneously, availability may be conditional upon authentication. In some implementations, authentication may include providing one or more of a username, a channel identification, and a password.

Order component 35 may be configured to determine in which order a set of files should be transferred. In some implementations, the files may include items of audiovisual content. For example, camera device 11 may have captured two or more items of audiovisual content that need to be transferred to centralized server 12. Order component 35 may be configured to determine in which order these two items should be transferred. In some implementations, the order of different files may be based on file size. Alternatively, and/or simultaneously, in some implementations, the order of different files may be based on the content type of the different files. For example, still images may be ordered to be transferred before video messages. Alternatively, and/or simultaneously, in some implementations, a user may select which criteria are to be used in which sequence to determine the order for transferring multiple files. For example, in some implementations, a user may decide that items of audiovisual content that have been tagged should be transferring with higher priority than other items (i.e., placed ahead in the order for transfer). Alternatively, and/or simultaneously, in some implementations, a user may decide that items of audiovisual content that have been highlighted should be transferring with higher priority than other items (i.e., placed ahead in the order for transfer).

Components of system 100 may be operatively linked via one or more electronic communication links. For example, such electronic communication links may be established, at least in part, via one or more networks 120. In some implementations, network 120 may include the Internet and/or may employ other communications technologies and/or protocols. By way of non-limiting example, network 120 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, network 120 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over network 120 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 100 may use custom and/or dedicated data communications technologies instead of, or in addition to, the ones described above.

It will be appreciated that this is not intended to be limiting and that the scope of this disclosure includes implementations in which components of system 100 may be operatively linked via some other communication media.

External resources 124 may include sources of information, hosts, and/or other entities outside of system 100, external entities participating with system 100, and/or other resources. In some implementations, some or all of the functionality attributed herein to external resources 124 may be provided by resources included in system 100.

System 100 may include electronic storage 118. System 100 may include communication lines or ports to enable the exchange of information with a network and/or other entities. Illustration of system 100 in FIG. 1 is not intended to be limiting. System 100 may include a plurality of hardware, software, and/or firmware components operating together to provide the functionality attributed herein to system 100. For example, system 100 may be implemented by a cloud of computing platforms operating together.

Electronic storage 118 may include electronic storage media that electronically stores information. The electronic storage media of electronic storage 118 may include one or both of system storage that is provided integrally (i.e., substantially non-removable) with system 100 and/or removable storage that is removably connectable to system 100 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 104, information received from components of system 100, and/or other information that enables system 100 to function as described herein.

Processor(s) 104 may be configured to provide information-processing capabilities in system 100. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. Processor 104 may be configured to execute components 21-35. Processor 104 may be configured to execute components 21-35 by software; hardware; firmware; some combination of software, hardware, and/or firmware; and/or other mechanisms for configuring processing capabilities on processor 104.

It should be appreciated that although components 21-35 are illustrated in FIG. 1 as being co-located within a single processing unit, in implementations in which processor 104 includes multiple processing units, one or more of components 21-35 may be located remotely from the other components. The description of the functionality provided by the different components 21-35 described above is for illustrative purposes and is not intended to be limiting, as any of components 21-35 may provide more or less functionality than is described. For example, one or more of components 21-35 may be eliminated, and some or all of its functionality may be provided by other ones of components 21-35 and/or other components. As another example, processor 104 may be configured to execute one or more additional components that may perform some or all of the functionality attributed below to one of components 21-35.

Figure 4:
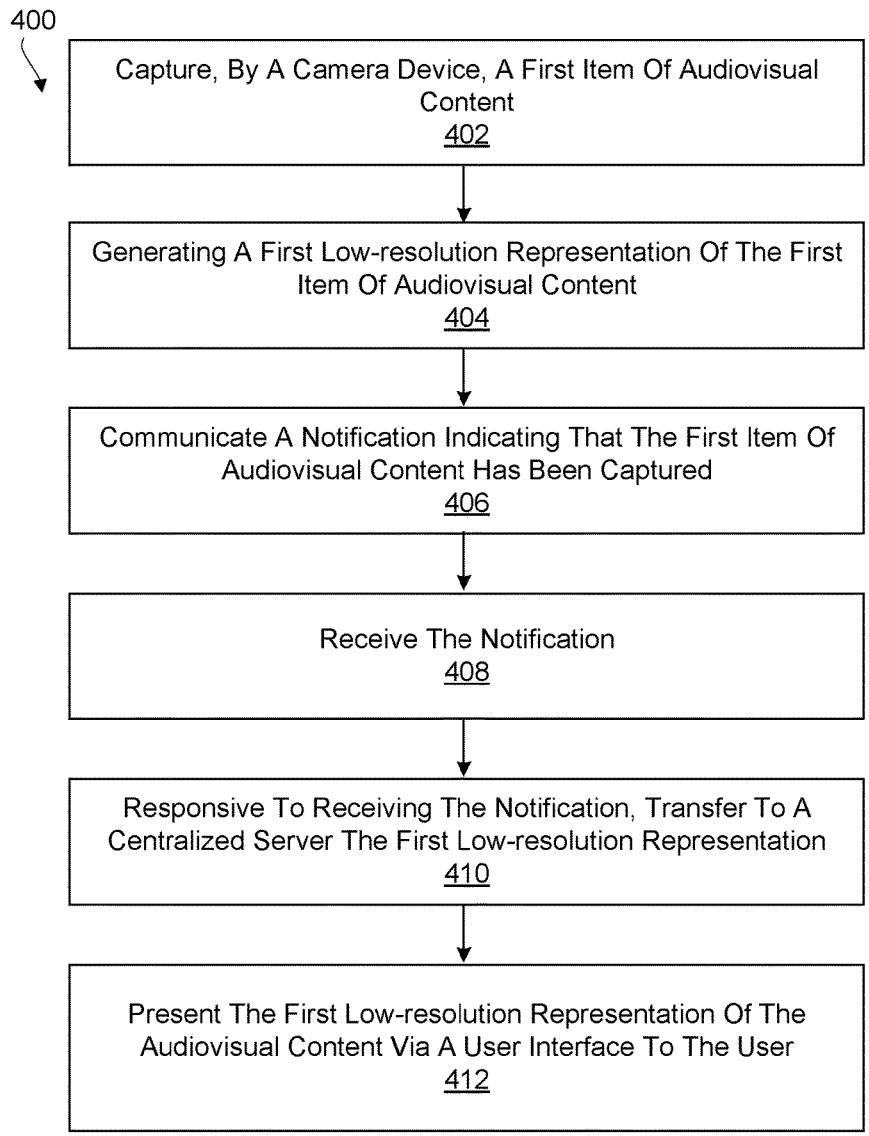
FIGS. 4-5 illustrate methods for automatically transferring audiovisual content, in accordance with one or more implementations.
Figure 5:
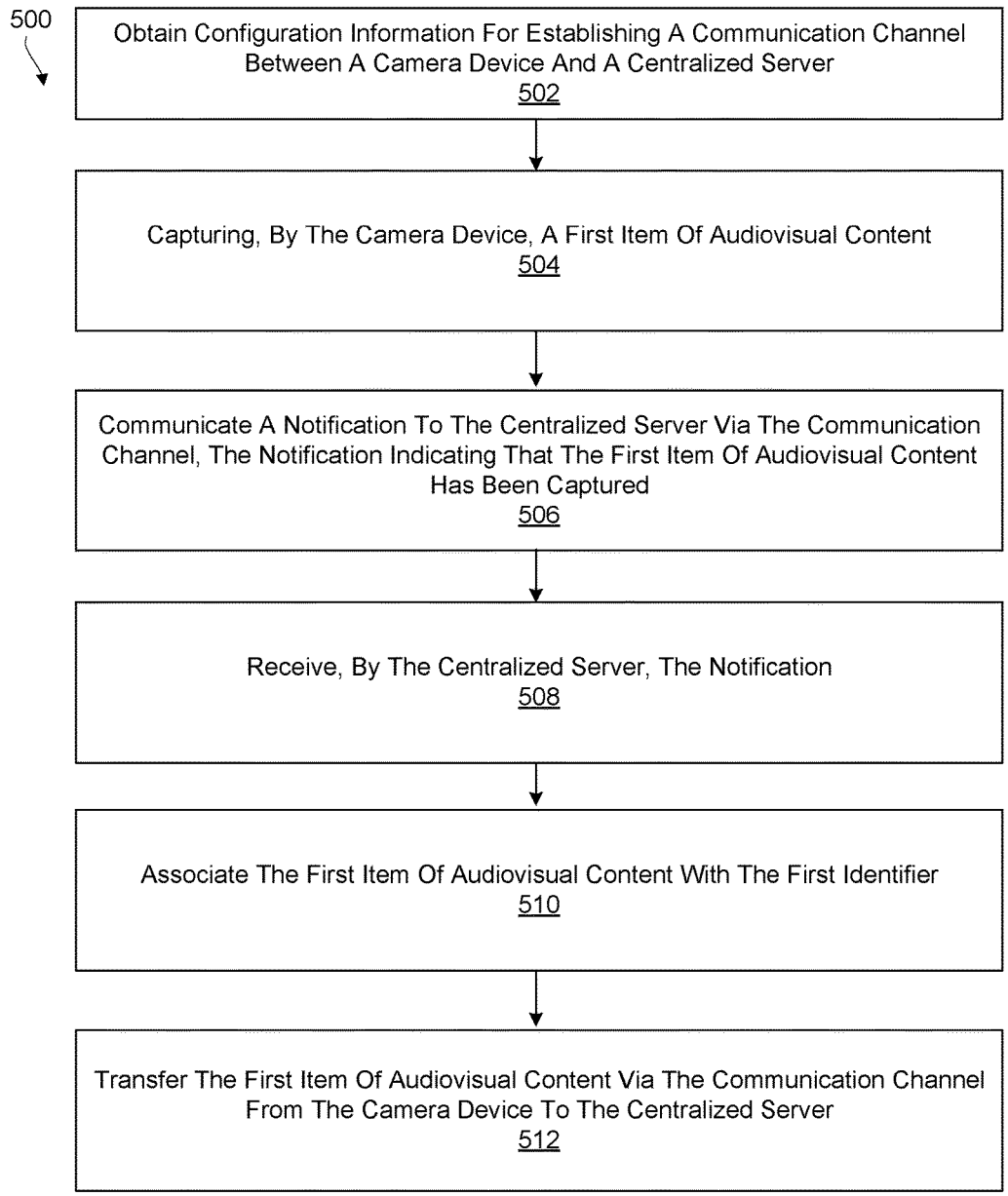

FIGS. 4 and 5 illustrate a method 400 and a method 500 for automatically transferring audiovisual content, in accordance with one or more implementations. The operations of these methods presented below are intended to be illustrative. In some embodiments, these methods may be accomplished with one or more additional operations not described, and/or without one or more of the operations discussed. Additionally, the order in which the operations of these methods are illustrated in FIGS. 4-5 and described below is not intended to be limiting.

In some embodiments, these methods may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of these methods in response to instructions stored electronically on electronic storage medium. The one or more processing devices may include one or more devices configured through hardware, firmware, and/or software to be specifically designed for execution of one or more of the operations of these methods.

Regarding method 400, at an operation 402, a first item of audiovisual content is captured. In some embodiments, operation 402 is performed by a camera device the same as or similar to camera device 11 (shown in FIG. 1 and described herein).

At an operation 404, a first low-resolution representation of the first item of audiovisual content is generated. In some embodiments, operation 404 is performed by a camera device the same as or similar to camera device 11 (shown in FIG. 1 and described herein).

At an operation 406, a notification is communicated wirelessly, the notification indicating that the first item of audiovisual content has been captured. A first identifier that identifies the first item of audiovisual content is derived from the first item of audiovisual content. In some embodiments, operation 406 is performed by a camera device the same as or similar to camera device 11 (shown in FIG. 1 and described herein).

At an operation 408, a notification is received by a client computing device associated with a user. The client computing device is physically separate and distinct from the camera device. In some embodiments, operation 408 is performed by a client computing device the same as or similar to client computing device 15 (shown in FIG. 1 and described herein).

At an operation 410, transfer is effectuated to a centralized server of the first low-resolution representation and the first identifier. In some embodiments, operation 410 is performed by a client computing device and/or camera device the same as or similar to client computing device 15 and/or camera device 11 (shown in FIG. 1 and described herein).

At an operation 412, the first low-resolution representation of the audiovisual content is presented via a user interface to the user. In some embodiments, operation 412 is performed by a client computing device the same as or similar to client computing device 15 (shown in FIG. 1 and described herein).

Regarding method 500, at an operation 502, configuration information is obtained. The configuration information supports establishment of a communication channel between a camera device and the centralized server. In some embodiments, operation 502 is performed by a camera device the same as or similar to camera device 11 (shown in FIG. 1 and described herein).

At an operation 504, a first item of audiovisual content is captured. In some embodiments, operation 504 is performed by a camera device the same as or similar to camera device 15 (shown in FIG. 1 and described herein).

At an operation 506, a notification is communicated to the centralized server via the communication channel, the notification indicating that the first item of audiovisual content has been captured. A first identifier that identifies the first item of audiovisual content is derived from the first item of audiovisual content. The notification includes a first low-resolution representation of the first item of audiovisual content and the first identifier. In some embodiments, operation 506 is performed by a camera device the same as or similar to camera device 11 (shown in FIG. 1 and described herein).

At an operation 508, the notification is received. In some embodiments, operation 508 is performed by a centralized server the same as or similar to centralized server 12 (shown in FIG. 1 and described herein).

At an operation 510, the first item of audiovisual content is associated with the first identifier. In some embodiments, operation 510 is performed by a centralized server the same as or similar to centralized server 12 (shown in FIG. 1 and described herein).

At an operation 512, the first item of audiovisual content is transferred via the communication channel from the camera device to the centralized server. In some embodiments, operation 512 is performed by a camera device the same as or similar to camera device 11 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for automatically transferring audiovisual content, the system comprising:
    a camera device configured to:
        obtain configuration information, wherein the configuration information supports establishment of a communication channel between the camera device and the computing device;
        capture a first item of audiovisual content;
        generate a notification indicating that the first item of audiovisual content has been captured by the camera device, the notification including a first identifier that identifies the first item of audiovisual content, the first identifier derived from content of the first item of audiovisual content;
        transfer the notification to the computing device;
        receive a request for the first item of audiovisual content from the computing device; and
        responsive to the request, transfer the first item of audiovisual content to the computing device; and
    a computing device configured to:
        communicate with the camera device;
        manage electronic access to and storage of items of audiovisual content;
        receive the notification from the camera device prior to reception of the first item of audiovisual content;
        effectuate registration of the first item of audiovisual content, the registration of the first item of audiovisual content including an association between the first item of audiovisual content and the first identifier, wherein a registration status of the first item of audiovisual content indicates whether the first item of audiovisual content has been transferred to the computing device;
        transfer the request for the first item of audiovisual content to the computing device; and
        receive the first item of audiovisual content from the camera device.

2. The system of claim 1, wherein the first identifier is a content-based unique identifier.

3. The system of claim 1, wherein the camera device is further configured to detect whether the communication channel is available, and wherein transfer of the first item of audiovisual content is performed responsive to detection that the communication channel is available.

4. The system of claim 3, wherein the camera device is further configured to, responsive to detection that the communication channel is available, establish the communication channel between the camera device and the computing device, wherein establishment of the communication channel is based on the configuration information.

5. The system of claim 1, wherein the camera device includes a rechargeable battery, wherein the camera device is further configured to:
    determine whether the rechargeable battery is holding a charge that meets at least a predetermined charge threshold,
    wherein transfer of the first item of audiovisual content is performed responsive to a determination that the charge held by the rechargeable battery meets the predetermined charge threshold.

6. The system of claim 1, wherein the camera device is further configured to:
    capture a second item of audiovisual content;
    determine an order of the transfer of the first item of audiovisual content and the second item of audiovisual content.

7. The system of claim 6, wherein the order of the transfer of the first item of audiovisual content and the second item of audiovisual content is determined based on content types of the first item of audiovisual content and the second item of audiovisual content.

8. The system of claim 1, wherein the computing device is, to manage electronic access to and storage of the items of audiovisual content, further configured to synchronize storage of copies of the first item of audiovisual content in multiple computing devices.

9. The system of claim 8, wherein synchronization of the storage of the copies of the first item of audiovisual content in multiple computing devices includes:
   a first copy of the first item of audiovisual content being transferred by the computing device for storage in a first client computing device;
   a second copy of the first item of audiovisual content being transferred by the computing device for storage in a second client computing device;
   reception, by the computing device, of operation information defining one or more operations to modify the first item of audiovisual content; and
   propagating, by the computing device, the one or more operations to modify the first item of audiovisual content to the first client computing device and the second client computing device.

10. The system of claim 9, wherein the first identifier is regenerated responsive to one or more changes in the content of the first item of audiovisual content, and the regenerated first identifier is propagated to the first client computing device and the second client computing device.

11. A method for automatically transferring audiovisual content, the method performed by a camera device, the method comprising:
   obtaining, by the camera device, configuration information, wherein the configuration information supports establishment of a communication channel between the camera device and a computing device;
   capturing, by the camera device, a first item of audiovisual content;
   generating, by the camera device, a notification indicating that the first item of audiovisual content has been captured by the camera device, the notification including a first identifier that identifies the first item of audiovisual content, the first identifier derived from content of the first item of audiovisual content;
   transferring, by the camera device, the notification to the computing device;
   receiving, by the camera device, a request for the first item of audiovisual content from the computing device; and
   responsive to the request, transferring, by the camera device, the first item of audiovisual content to the computing device;
   wherein the computing device:
      communicates with the camera device;
      manages electronic access to and storage of items of audiovisual content;
      receives the notification from the camera device prior to reception of the first item of audiovisual content;
      effectuates registration of the first item of audiovisual content, the registration of the first item of audiovisual content including an association between the first item of audiovisual content and the first identifier, wherein a registration status of the first item of audiovisual content indicates whether the first item of audiovisual content has been transferred to the computing device;
      transfers the request for the first item of audiovisual content to the computing device; and
      receives the first item of audiovisual content from the camera device.

12. The method of claim 11, wherein the first identifier is a content-based unique identifier.

13. The method of claim 11, further comprising detecting, by the camera device, whether the communication channel is available, wherein transfer of the first item of audiovisual content is performed responsive to detection that the communication channel is available.

14. The method of claim 13, further comprising, responsive to detection that the communication channel is available, establishing, by the camera device, the communication channel between the camera device and the computing device, wherein establishment of the communication channel is based on the configuration information.

15. The method of claim 11, wherein:
   the camera device includes a rechargeable battery: and
   transfer of the first item of audiovisual content is performed responsive to a determination that the charge held by the rechargeable battery meets the predetermined charge threshold.

16. The method of claim 11, further comprising:
   capturing, by the camera device, a second item of audiovisual content;
   determining, by the camera device, an order of the transfer of the first item of audiovisual content and the second item of audiovisual content.

17. The method of claim 16, wherein the order of the transfer of the first item of audiovisual content and the second item of audiovisual content is determined based on content types of the first item of audiovisual content and the second item of audiovisual content.

18. The method of claim 11, wherein the computing device managing electronic access to and storage of the items of audiovisual content includes synchronizing storage of copies of the first item of audiovisual content in multiple computing devices.

19. The method of claim 18, wherein synchronizing the storage of the copies of the first item of audiovisual content in multiple computing devices includes:
   a first copy of the first item of audiovisual content being transferred by the computing device for storage in a first client computing device;
   a second copy of the first item of audiovisual content being transferred by the computing device for storage in a second client computing device;
   reception, by the computing device, of operation information defining one or more operations to modify the first item of audiovisual content; and
   propagating, by the computing device, the one or more operations to modify the first item of audiovisual content to the first client computing device and the second client computing device.

20. The method of claim 19, wherein the first identifier is regenerated responsive to one or more changes in the content of the first item of audiovisual content, and the regenerated first identifier is propagated to the first client computing device and the second client computing device.

* * * * *

UNITED STATES PATENT AND TRADEMARK OFFICE
CERTIFICATE OF CORRECTION

PATENT NO. : 10,397,415 B1  
APPLICATION NO. : 15/282429  
DATED : August 27, 2019  
INVENTOR(S) : Jeffrey Youel Page 1 of 1

It is certified that error appears in the above-identified patent and that said Letters Patent is hereby corrected as shown below:

In the Claims

In Claim 1, Column 22, Line 28, please delete "computing" and insert --camera--, therefor.

In Claim 11, Column 24, Line 2, please delete "computing" and insert --camera--, therefor.

Signed and Sealed this  
Twelfth Day of January, 2021

Andrei Iancu  
*Director of the United States Patent and Trademark Office*